United States Patent [19]

Inoue

[11] Patent Number: 4,486,642
[45] Date of Patent: Dec. 4, 1984

[54] ELECTROEROSIVE CONTOUR-MACHINING METHOD

[75] Inventor: Kiyoshi Inoue, Tokyo, Japan

[73] Assignee: Inoue-Japax Research Incorporated, Yokohama, Japan

[21] Appl. No.: 359,489

[22] Filed: Mar. 18, 1982

[51] Int. Cl.³ .............................................. B23P 1/08
[52] U.S. Cl. ............................. 219/69 W; 219/69 M
[58] Field of Search .................... 219/69 R, 68, 69 W, 219/69 M

[56] References Cited

U.S. PATENT DOCUMENTS 4,123,645 10/1978 Shichida et al. ................. 219/69 W
4,193,852 3/1980 Inoue ............................... 219/69 W

FOREIGN PATENT DOCUMENTS 0163833 12/1981 Japan ............................... 219/69 W Primary Examiner—M. H. Paschall
Attorney, Agent, or Firm—Karl F. Ross; Herbert Dubno

[57] ABSTRACT

A method of contour-machining a workpiece by axially transporting an electrode wire through the workpiece while advancing the workpiece relative to the axis of travel of the electrode wire in a plane substantially orthogonal to the axis of travel to electroerosively cut a groove progressively along a programmed closed-loop path of a predetermined contour whereby the workpiece is eventually severed into a central portion and a peripheral portion with respect to the contour-cut groove. The workpiece and wire support/guide members are positioned to enable the workpiece to move relative to the traveling electrode wire in a vertical plane in a two-dimensional coordinate system. The programmed closed-loop path is arranged on the positioned workpiece in the two-dimensional coordinate system and divided into an upper path and a lower path. The positioned workpiece and wire support/guide members are relatively displaced to advance the traveling electrode wire continuously along the programmed cutting path in the coordinate system, first along a portion of said upper path, then along the lower path throughout and finally along the remaining portion of the upper path. The resulting central portion when severed from the peripheral portion is then allowed to fall within and rest on the peripheral portion without hitting on or squeezing the electrode wire against the walls of the peripheral portion.

7 Claims, 2 Drawing Figures

ELECTROEROSIVE CONTOUR-MACHINING METHOD

FIELD OF THE INVENTION

The present invention relates to traveling-wire electroerosion contour-machining. In particular, it relates to a method of contour-machining a workpiece by axially transporting an electrode wire, ribbon or tape (all referred to hereinafter as "wire") while advancing the workpiece relative to the axis of travel of the electrode wire in a plane substantially orthogonal to the axis of travel to electroerosively cut a groove progressively along a programmed closed-loop path of a predetermined contour whereby the workpiece is eventually severed into a central portion and a peripheral portion with respect to the contour-cut groove.

BACKGROUND OF THE INVENTION

In conventional traveling-wire electroerosion machines widely in production use today, the electrode wire is arranged to travel vertically up to down or vice versa and the work supporting plane is arranged to extend horizontally. As a result, when the traveling electrode wire finishes cutting over the entire closed-loop path, the central severed portion of the workpiece becomes unsupported and, due to gravity drops off the supported peripheral portion, tending during drop to hit on the wire and hence to give rise to wire breakage and to damaging short-circuiting against the electrode wire. While various measures such as the use of a permanent magnet designed to magnetically bridge the two portions before they are separated have been used to overcome the problem of drop-off of the central severed portion, the conventional measures require an interruption of the machining operation and have been found to be inefficient and unsatisfactory.

OBJECTS OF THE INVENTION

It is, accordingly, a principal object of the present invention to provide a novel contour-machining method of the type described which effectively and efficiently overcomes the problem of drop-off of the central severed portion in the machined workpiece.

A specific object of the present invention is to provide a novel and improved method of and system for contour-machining a workpiece whereby when the latter is severed into a central and peripheral portions, the electrode wire may not be squeezed between the two portions and hence not be damaged by the central portion dropping off and hitting on the peripheral portion.

A further object of the invention is to provide a novel and improved method of and system of the type described which allows a given machining operation to continue without interruption and with stability.

SUMMARY OF THE INVENTION

These and other objects which will become apparent hereinafter are attained in accordance with the present invention by a method of contour-machining a workpiece by axially transporting an electrode wire through the workpiece between spaced apart wire support/guide members while advancing the workpiece relative to the axis of travel of the electrode wire in a displacement plane substantially orthogonal to the traveling axis to electroerosively cut a groove progressively along a programmed closed-loop path of a predetermined contour whereby the workpiece is eventually severed into an unsupported central portion and a supported peripheral portion with respect to the contour-cut groove, which method comprises the steps of: (a) positioning the workpiece and the wire support/guide members so as to enable the workpiece to move, relative to the traveling electrode wire, in a substantially vertical plane constituting the said displacement plane and defined a two-dimensional coordinate system therein; (b) arranging the programmed closed-loop cutting path on the positioned workpiece in the said coordinate system and dividing the said path into an upper path and a lower path; (c) threading the electrode wire through the positioned workpiece between the positioned wire support/guide members; and (d) relatively displacing the positioned workpiece and wire support/guide members to advance the threaded traveling electrode wire continuously along the programmed cutting path in the said coordinate system, first along a portion of the upper path, then along the lower path throughout and finally along the remaining portion of the upper path. It follows therefore that the central portion severed from the peripheral portion is allowed to fall off by gravity to rest on the peripheral portion without hitting on the electrode wire. The central portion parting along its upper flank from the upper flank of the peripheral portion comes at its lower flank in mating contact with the lower flank of the peripheral portion.

Specifically, the electrode wire may be threaded through a starting hole preformed in the workpiece at a position, conveniently closely spaced from the aforementioned upper path, and the positioned workpiece and wire support/guide members may be relatively displaced to advance the threaded traveling electrode wire continuously first along a straight line path connecting the starting hole and the said portion of the aforementioned upper path and then along the latter. It should be noted that the advance of the threaded traveling electrode wire may commence at a junction between the upper and lower paths, followed by continuous advance along the lower path throughout and then the upper path throughout.

The invention also provides, in a second aspect thereof, an arrangement for contour-machining a workpiece by axially transporting an electrode wire through the workpiece while advancing the workpiece relative to the axis of travel of the electrode wire in a displacement plane substatially orthogonal to the axis of travel to electroerosively cut a groove progressively along a programmed closed-loop path of a predetermined contour whereby the workpiece is eventually severed into a central portion and a peripheral portion with respect to the contour-cut groove, which arrangement comprises: a pair of wire support/guide members flanking the workpiece and disposed to support and guide the electrode wire to axially travel along a substantially horizontally extending linear path therebetween and through the workpiece; and work support means for securely mounting the workpiece thereon and displaceable to move the workpiece, relative to the traveling electrode wire, in a substantially vertical plane constituting said displacement plane therein a two-dimensional coordinate system in which the programmed closed-loop cutting path is arranged on the workpiece and is divided into an upper path and a lower path; means for threading the electrode wire through the workpiece between the wire support/guide members;

and machining-feed means for relatively displacing the work support means and the wire support/guide members to advance the threaded traveling electrode wire continuously along the programmed closed-loop cutting path in the two-dimentional coordinate system, first along a portion of the upper path, then along the lower path throughout and finally along the remaining portion of the upper path.

BRIEF DESCRIPTION OF THE DRAWING

These and other features and advantages of the present invention will become more readily apparent from the following description of certain preferred embodiments thereof made with reference to the accompanying drawing in which.

SPECIFIC DESCRIPTION

Figure 1:
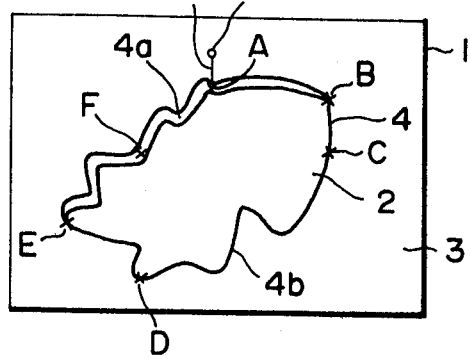
FIG. 1 is a side view diagrammatically illustrating a workpiece which after contour-machining according to the invention was severed into a central portion and a peripheral portion, the central portion within the peripheral portion being shown resting on the lower flank of the peripheral portion.

Referring to FIG. 1, a workpiece 1 in the form of a rectangular block and mounted vertically is shown as having been electroerosively contour-cut with an electrode wire into two severed portions, the central portion 2 and the peripheral portion 3. The workpiece was contour-cut by advancing the axis of travel of the electrode wire along a programmed closed-loop path 4 in a two-dimensional coordinate system on the workpiece 1, which path can be divided into an upper path 4a and a lower path 4b. The "upper" and "lower" paths are such that every point on the upper path can be shifted vertically downwards to fall on the lower path. In the particular closed-loop cutting path 4 shown in FIG. 1, the lower path 4b includes positions B, C, D and E whilst the upper path 4a includes positions E, F, A and B. Alternatively, the lower path 4b may start at C and end at E while the upper path 4a starting at E and passing F, A and B may end at C.

The electrode wire was initially threaded through a starting hole 5 preformed in the workpiece 1 at a position S conveniently spaced closely from the upper path 4a. The starting hole 5 may be preformed either inside or outside the closed-loop cutting path 4 depending on which of the eventually severed central and peripheral portions 2 and 3 is required to constitute a product. In FIG. 1, the preformed starting hole 5 is shown to be outside the cutting path 4 because the eventual central portion 2 with the machined peripheral contour is designed to form a product. The threaded electrode wire while traveling axially must initially advance, conveniently linearly, from the position S until it reaches the closed-loop path 4. In FIG. 1, it is shown that the electrode wire advanced from the starting hole 5 along a straight line, leaving a straight cut groove 6, to the position A on the programmed cutting path 4 at which the required cutting commenced. In accordance with the present invention, the starting position A on the programmed closed-loop path 4 was selected on the upper path 4a and the electrode wire was advanced first along A-B, a portion of the upper path 4a, then along B-C-D-E, the entire lower path and finally along E-F-A, the remaining portion of the upper path 4a back to the starting position A. When the electrode wire is back to the starting position A, the workpiece 1 is severed into the central portion 2 and the peripheral portion 3. It will be seen that while the peripheral portion 3 remains supported, the central portion 2 becomes unsupported and falls downwards by its own weight due to gravity. In the arrangement shown, the falling central portion 2 severed off the peripheral portion 3 at the starting point A is advantageously caught by the peripheral portion 3, without hitting on the electrode wire or without squeezing the electrode wire against the flank of the peripheral portion 3 since the electrode wire is located at the starting/final position A on the upper path. It will be understood that the starting/final position may be selected at any point on the upper path 4a which includes points E, F, A and B. It may be one of junctions E, B of the upper and lower paths 4a and 4b. In case one junction of the two paths 4a and 4b is taken to be the position C, the lower end of the vertical path BC, the upper path may include the position C.

Figure 2:
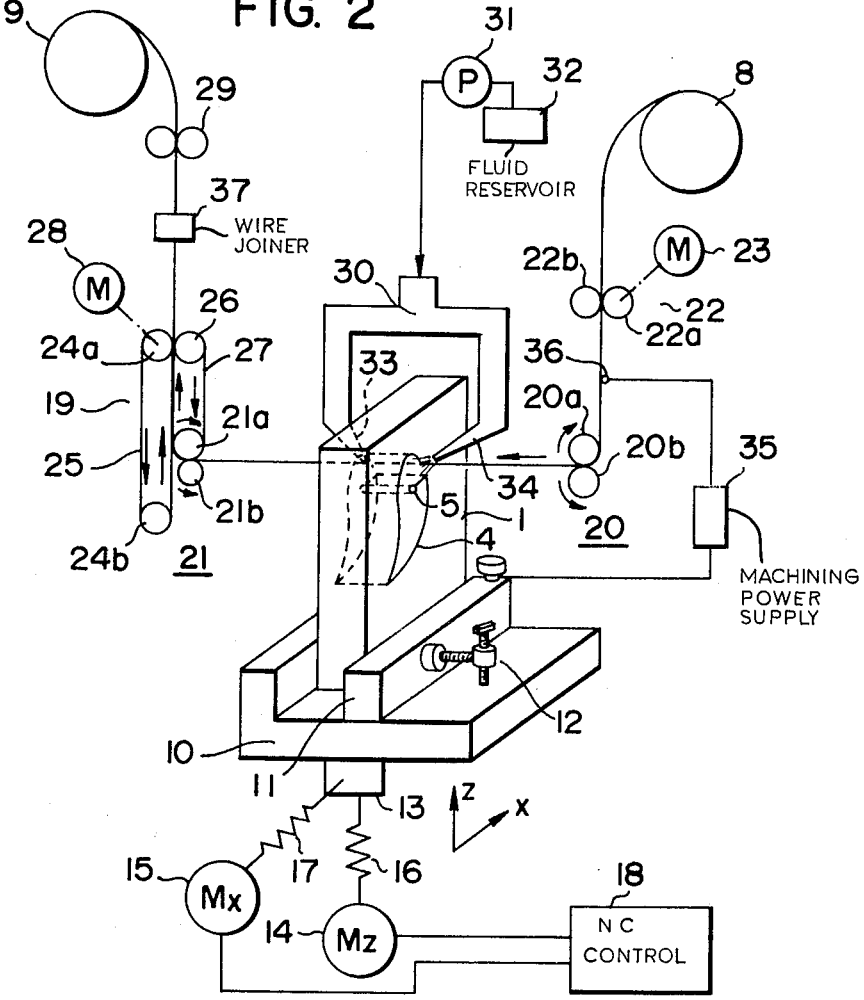
FIG. 2 is a perspective view diagrammatically illustrating a workpiece and an electrode wire arranged in the traveling-wire electroerosion system according to the invention.

In FIG. 2 there is shown a traveling electroerosion contour-machining arrangement according to the present invention. A rectangular block constituting the workpiece 1 is shown as mounted vertically on a workpiece support 10 and secured thereto with a holding plate 11 by means of a clamping bolt unit 12. It will be seen that the workpiece may be of any shape but will practically be a rectangular block as shown, a disk or a plate having at least two parallel opposite side surfaces across which a contoured cut is machined. Such two surfaces of the workpiece 1 positioned as shown extend vertically. The work support 10 is carried on a drive table 13 which is driven by a Z-axis motor 14 and an X-axis motor 15 via lead screws 16 and 17, respectively, to displace the workpiece 1 in a vertical plane comprised of a two-dimensional Z-X coordinate system in which a programmed cutting path 4 is arranged. The motors 14 and 15 are driven by drive signals furnished by a control unit 18, e.g. an NC (numerical control) unit.

The continuous electrode wire designated at 7 is shown as drawn from a supply reel 8 onto a takeup reel 9. The electrode wire 7 is axially transported continuously by a wire drive forward traction unit 19 and is shown as continuously traveling through the workpiece 1 at a given rate of travel in the process of machining a contoured cut 4 therein. Two wire support/guide members 20 and 21 each in the form of two abutting rotatable rollers 20a, 20b and 21a, 21b, respectively are arranged to support and guide the electrode wire 7 along a linear path therebetween across the workpiece 1. A braking unit 22 comprising a capstan 22a and pinch roller 22b is provided between the supply reel 8 and the wire support/guide member 20 to give the traveling wire 7 a tension to hold it sufficiently taut between the members 20 and 21 and to cause it to move precisely along the linear path of travel. The capstan 22a is driven by a motor 23 driven normally in a direction to cause the capstan 22a and pinch roller 22b to rotate to pull back the electrode wire 7. The wire drive forward traction unit 19 comprises a first pair of rollers 24a and 24b carrying an endless belt 25 and a second pair of rollers 26 and 21a carrying another endless belt 27. The roller 24a is driven by a motor 28 to displace the belts 25 and 27 to roll the electrode wire 7 passing over the guide member 21 between them and to allow it to be taken up on the takeup reel 9 via a further pair of guide rollers 29.

Shown above the cutting zone is a bifurcated nozzle assembly 30 fed by a pump 31 with a liquid machining medium from a reservoir 32 and provided with a pair of nozzle openings 33 and 34 for directing a stream of the machining medium onto the traveling electrode 7 intersecting the workpiece 1. An electrical machining power supply 35 has one terminal electrically connected to the electrode wire 7 via a conducting roller 36 and the other terminal electrically connected to the workpiece 1 via the conducting plate 11 for applying an electrical machining current, typically or preferably in the form of a succession of electrical pulses, between the traveling electrode wire 7 and the workpiece 1 across the liquid-filled machining gap to electroerosively remove material from the latter. The machining liquid, medium may be a dielectric liquid such a distilled water, or a liquid electrolyte such as an aqueous solution of electrolyte.

The traveling electrode wire 7 is shown in FIG. 2 in the stage shortly before it finishes advancement over the entire closed-loop cutting path 4. In FIG., it will be seen that cutting was initiated at a starting hole 5 preformed in the workpiece 1 inside the closed-loop path 4. In that case, the eventually severed peripheral portion with the contour-cut inside flank may constitute product.

Prior to initiating the cutting operation, the electrode wire 7 must be threaded through the preformed starting hole 5. For the threading operation, a free end of the continuous wire 7 leading from the supply reel 8 is passed between the abutting rollers 20a and 20b to juxtapose with the workpiece 1 and the drive table 13 is driven to position the starting hole 5 in the workpiece 1 in alignment with the free end portion of the electrode wire 7. The motor 23 must then be driven in the direction opposite to the normal braking direction to advance the free end portion to cause it to be threaded through the starting hole 5 and then to be rolled between the other wire support/guide rollers 21a and 21b and then between the moving belts 25 and 27. When that free end portion is rolled in, the motor 23 may be stopped. The motor 28 is stopped when that free end portion projects by a given length from the belts 25 and 27. From the takeup reel 9 there is also led a free end portion of the wire and projected downwards from the guide rollers 29. A wire joining unit 37, e.g. a fusion-welding assembly, is arranged in the wire travel path between the guide rollers 29 and rollers 24a and 26 to join the free end portion of the electrode wire 7 passed through the starting hole 5 with the free end portion of the wire leading from the takeup reel 9. When they are joined together, the motor 28 may be driven again to allow the continuous electrode wire 7 extending between the supply and collection reels 8 and 9 to be transported continuously through the workpiece 1.

The starting hole 5 may be formed either before or after the workpiece 1 is positioned vertically as shown. It may be drilled by any conventional process such as electroerosion machining. It may, for example, be drilled after the workpiece 1 is positioned, by operating the worktable drive unit 14, 15 under the control of or without the NC unit 18, to locate the position S in the Z-X coordinate system in FIG. 1 precisely in alignment with the straight line path defined between the wire support/guide members 20 and 21. Then, the free end portion of the electrode wire 7 leading from the supply reel is advanced by the motor 23 through the wire support/gude member 20 into electroerosive machining relationship with the workiece 1 while the machining liquid medium is supplied from the nozzle 34 into the gap between the free end of the wire electrode 7 and the workpiece 1. An electrical machining current is applied between the wire electrode 7 and the workpiece 1 while the wire electrode 7 is continuously advanced by the motor 23 at a controlled rate to progressively drill the starting hole 5 which eventually penetrates and hence is threaded through the workpiece 1 at the position S. The free end portion of the electrode wire 7 thus threaded through the starting hole 5 is then taken up through the drive unit 19 and joined by connecting unit 37 previously described.

It is sometimes possible that the starting hole 5 lies on the cutting path 4. The starting hole 5 should then be on the upper path 4a on the workpiece 1 arranged as shown.

In accordance with the present invention, it has been noted that continuous cutting along a programmed closed-loop path 4 as shown in FIG. 1 commences with a position A and passes B, C, D, E, F and back to A. Accordingly, the control unit 18 incorporates a memory having data preprogrammed therein for a sequence of coordinate positions in the two-dimensional (Z-X) coordinate system including S, A, B, C, D, E, F and A. The data are reproduced and/or converted into a succession of drive signals (pulses) for the motors 14 and 15 to displace the workpiece 1 so that the axis of travel of the electrode wire 7 advances along the closed-loop path in the indicated order of these positions. It will be appreciated that the reversal of the order of the indicated position gives no essential change in effect. Thus, it is obvious that the electrode wire 7 may advance from the position A, via F, E, D, C and B, back to A. It has also been noted that the electrode wire 7 may advance from the position B, via C, D, E, F, and A, back to B or from the position C, via D, E, F, A and B, back to C. It is only essential that the electrode wire 7 advance continuously along the programmed cutting path 4 in the coordinate system, first along a portion of the upper path 4a, then the lower path 4b throughout and finally along the remaining portion of the upper path 4a. If the tangent to the closed-loop path at the starting position does not extend horizontally, it is desirable to advance the electrode wire 7 so as to leave the starting position downwards. Thus, it is less desirable to advance from B, via A, F, E, D and C, back to B, or from C, via B, A, F, E and D, back to C. As the result of advancing the electrode wire 7 along the complete lower path 4b first and initially in a direction such as to leave the startig position downwards, the electrode wire 7 turns back to the starting position from up, thereby permitting the severed central portion 2 to fall off while leaving the electrode wire 7. When the tangent at the starting position extends substantially horizontally, the electrode wire 7 may start advancing either to the right or to the left. Another advantage that accrues from advancing the electrode wire 7 along the complete lower path 4b first is that the central portion 2 2 tending to develop tends to fall due to gravity. This causes the groove being formed on the upper zone to tend to uniformly expand, thereby facilitating flushing of the gap machining products with the liquid machining medium supplied from the nozzles 33 and 34 and hence enhancing the stability of electroerosive cutting over the entire path.

What is claimed is:

1. A method of contour-machining a workpiece by axially transporting an electrode wire through the workpiece disposed between a pair of wire support/guide members while advancing the workpiece relative to the traveling axis of the electrode wire in a displacement plane substantially orthogonal to the traveling axis to electroerosively cut a groove progressively along a programmed closed-loop path of a predetermined contour whereby the workpiece is eventually severed into a central portion and a peripheral portion with respect to the contour-cut groove, the method comprising the steps of:

(a) positioning said workpiece and said wire support/guide members to enable the workpiece to move, relative to the traveling electrode wire, in a substantially vertical plane constituting said displacement plane and having a two-dimensional coordinate system;

(b) arranging said programmed closed-loop path on the positioned workpiece in said coordinate system and dividing it into an upper path and a lower path;

(c) threading said electrode wire through the positioned workpiece between the positioned wire support/guide members; and (d) relatively displacing the positioned workpiece and wire support/guide members to advance the threaded traveling electrode wire continuously along said programmed closed-loop path in said coordinate system, from a starting position at an intermediate location along said upper path downwardly along a portion of said upper path, then along said lower path throughout and finally along the remaining portion of said upper path.

2. The method defined in claim 1 wherein said electrode wire leaves said starting position substantially vertically.

3. The method defined in claim 1 wherein said electrode wire leaves said starting position nonvertically.

4. The method defined in claim 1 wherein said upper and lower paths are such that every point on said upper path lies vertically above said lower path.

5. The method defined in claim 1, wherein in step (c) said electrode wire is threaded through a starting hole preformed in said workpiece.

6. The method defined in claim 5 wherein said preformed starting hole is located proximal to said upper path.

7. The method defined in claim 6, further comprising the step of, prior to step (d), advancing said electrode wire from said starting hole along a straight line path to said starting position.

* * * * *